(12) United States Patent
Chheda et al.

(10) Patent No.: US 9,582,650 B2
(45) Date of Patent: Feb. 28, 2017

(54) SECURITY OF PROGRAM EXECUTABLES AND MICROPROCESSORS BASED ON COMPILER-ARCHITECTURE INTERACTION

(71) Applicant: BlueRISC Inc., Amherst, MA (US)

(72) Inventors: Saurabh Chheda, Santa Clara, CA (US); Kristopher Carver, Chicopee, MA (US); Raksit Ashok, Karnataka (IN)

(73) Assignee: BlueRisc, Inc., Amherst, MA (US)

( * ) Notice: Subject to any disclaimer, the term of this patent is extended or adjusted under 35 U.S.C. 154(b) by 18 days.

(21) Appl. No.: 13/683,640

(22) Filed: Nov. 21, 2012

(65) Prior Publication Data

US 2013/0326236 A1 Dec. 5, 2013

Related U.S. Application Data

(63) Continuation of application No. 13/187,645, filed on Jul. 21, 2011, now abandoned, which is a
(Continued)

(51) Int. Cl.
*G06F 9/30* (2006.01)
*G06F 21/12* (2013.01)

(52) U.S. Cl.
CPC ........ *G06F 21/125* (2013.01); *G06F 9/30145* (2013.01); *G06F 9/30156* (2013.01); *G06F 9/30167* (2013.01); *G06F 9/30181* (2013.01)

(58) Field of Classification Search
CPC ............... G06F 21/125; G06F 9/30145; G06F 9/30156; G06F 9/30167; G06F 9/3017;
(Continued)

(56) References Cited

U.S. PATENT DOCUMENTS 3,603,934 A 9/1971 Heath
4,003,033 A 1/1977 O'keefe et al.
(Continued)

FOREIGN PATENT DOCUMENTS

EP 0314277 A2 * 5/1989
EP 0552816 7/1993
(Continued)

OTHER PUBLICATIONS

"Federal Information Processing Standard 46-3: Data Encryption Standard (FIPS 46-3)" Published Oct. 25, 1999 (27 pages) http://csrc.nist.gov/publications/fips/fips46-3/fips46-3.pdf.*
(Continued)

*Primary Examiner* — Joseph P Hirl
*Assistant Examiner* — Thomas Gyorfi
(74) *Attorney, Agent, or Firm* — Choate, Hall & Stewart LLP; Paul Pysher (57) ABSTRACT

A method, for use in a processor context, wherein instructions in a program executable are encoded with plural instruction set encodings. A method wherein a control instruction encoded with an instruction set encoding contains information about decoding of an instruction that is encoded with another instruction set encoding scheme. A method wherein instruction set encodings are randomly generated at compile time. A processor framework wherein an instruction is decoded during execution with the help of information provided by a previously decoded control instruction.

11 Claims, 3 Drawing Sheets

US 9,582,650 B2

Page 2

Related U.S. Application Data continuation of application No. 10/987,374, filed on Nov. 12, 2004, now Pat. No. 7,996,671.

(60) Provisional application No. 60/520,838, filed on Nov. 17, 2003.

(58) Field of Classification Search
CPC ............ G06F 9/30174; G06F 9/30178; G06F 9/30181; G06F 9/30185; G06F 9/30196
USPC .......................................... 713/190; 712/209
See application file for complete search history.

(56) References Cited

U.S. PATENT DOCUMENTS

| | | |
|---|---|---|
| 4,037,090 A | 7/1977 | Raymond |
| 4,042,972 A | 8/1977 | Grunes et al. |
| 4,050,058 A | 9/1977 | Garlic |
| 4,067,059 A | 1/1978 | Derchak |
| 4,079,455 A | 3/1978 | Ozga |
| 4,101,960 A | 7/1978 | Stokes et al. |
| 4,110,822 A | 8/1978 | Porter |
| 4,125,871 A | 11/1978 | Martin |
| 4,128,873 A | 12/1978 | Lamiaux |
| 4,138,720 A | 2/1979 | Chu et al. |
| 4,181,942 A | 1/1980 | Forster et al. |
| 4,255,785 A | 3/1981 | Chamberlin et al. |
| 4,354,228 A | 10/1982 | Moore et al. |
| 4,376,977 A | 3/1983 | Brunshorst |
| 4,382,279 A | 5/1983 | Mgon |
| 4,403,303 A | 9/1983 | Howes et al. |
| 4,410,939 A | 10/1983 | Kawakami |
| 4,434,461 A | 2/1984 | Puhl |
| 4,435,758 A | 3/1984 | Lorie et al. |
| 4,450,519 A | 5/1984 | Guttag et al. |
| 4,463,421 A | 7/1984 | Laws |
| 4,538,239 A | 8/1985 | Magar |
| 4,541,045 A | 9/1985 | Kromer |
| 4,562,537 A | 12/1985 | Barnett et al. |
| 4,577,282 A | 3/1986 | Caudel et al. |
| 4,592,013 A | 5/1986 | Prame |
| 4,604,695 A | 8/1986 | Widen et al. |
| 4,607,332 A | 8/1986 | Goldberg |
| 4,626,988 A | 12/1986 | George et al. |
| 4,649,471 A | 3/1987 | Briggs |
| 4,665,495 A | 5/1987 | Thaden |
| 4,679,140 A | 7/1987 | Gotou et al. |
| 4,709,329 A | 11/1987 | Hecker |
| 4,713,749 A | 12/1987 | Magar et al. |
| 4,714,994 A | 12/1987 | Oklobdzija et al. |
| 4,720,812 A | 1/1988 | Kao et al. |
| 4,772,888 A | 9/1988 | Kimura |
| 4,773,038 A | 9/1988 | Hillis et al. |
| 4,777,591 A | 10/1988 | Chang et al. |
| 4,787,032 A | 11/1988 | Culley et al. |
| 4,803,621 A | 2/1989 | Kelly |
| 4,860,198 A | 8/1989 | Takenaka |
| 4,870,562 A | 9/1989 | Kimoto |
| 4,873,626 A | 10/1989 | Gifford |
| 4,931,986 A | 6/1990 | Daniel et al. |
| 4,992,933 A | 2/1991 | Taylor |
| 5,021,993 A | 6/1991 | Matoba et al. |
| 5,036,460 A | 7/1991 | Takahira |
| 5,038,282 A | 8/1991 | Gilbert et al. |
| 5,045,995 A | 9/1991 | Levinthal et al. |
| 5,070,451 A | 12/1991 | Moore et al. |
| 5,111,389 A | 5/1992 | McAuliffe et al. |
| 5,121,498 A | 6/1992 | Gilbert et al. |
| 5,127,091 A | 6/1992 | Bonfarah |
| 5,136,697 A | 8/1992 | Johnson |
| 5,193,202 A | 3/1993 | Jackson et al. |
| 5,224,214 A | 6/1993 | Rosich |
| 5,230,079 A | 7/1993 | Grondalski |
| 5,276,895 A | 1/1994 | Grondalski |
| 5,361,367 A | 11/1994 | Fijany et al. |
| 5,410,669 A | 4/1995 | Biggs et al. |
| 5,430,854 A | 7/1995 | Sprague et al. |
| 5,440,749 A | 8/1995 | Moore et al. |
| 5,479,624 A | 12/1995 | Lee |
| 5,481,684 A | 1/1996 | Richter et al. |
| 5,481,693 A | 1/1996 | Blomgren et al. |
| 5,497,478 A | 3/1996 | Murata |
| 5,524,223 A | 6/1996 | Lazaravich et al. |
| 5,542,059 A * | 7/1996 | Blomgren ...................... 712/41 |
| 5,542,074 A | 7/1996 | Kim et al. |
| 5,551,039 A | 8/1996 | Weinberg et al. |
| 5,555,386 A | 9/1996 | Nomura |
| 5,555,428 A | 9/1996 | Radigan et al. |
| 5,560,028 A | 9/1996 | Sachs et al. |
| 5,579,520 A | 11/1996 | Bennett |
| 5,590,283 A | 12/1996 | Hillis et al. |
| 5,590,356 A | 12/1996 | Gilbert |
| 5,598,546 A * | 1/1997 | Blomgren ...................... 712/209 |
| 5,604,913 A | 2/1997 | Koyanagi et al. |
| 5,608,886 A | 3/1997 | Blomgren et al. |
| 5,630,143 A | 5/1997 | Maher et al. |
| 5,637,932 A | 6/1997 | Koreeda et al. |
| 5,638,525 A | 6/1997 | Hammond et al. |
| 5,638,533 A | 6/1997 | Law |
| 5,652,894 A | 7/1997 | Hu et al. |
| 5,655,122 A | 8/1997 | Wu et al. |
| 5,655,124 A | 8/1997 | Lin |
| 5,659,722 A | 8/1997 | Blaner et al. |
| 5,659,778 A | 8/1997 | Gingold et al. |
| 5,664,950 A | 9/1997 | Lawrence |
| 5,666,519 A | 9/1997 | Hayden |
| 5,684,973 A | 11/1997 | Sullivan et al. |
| 5,696,958 A | 12/1997 | Mowry et al. |
| 5,704,053 A | 12/1997 | Santhanam |
| 5,721,893 A | 2/1998 | Holler et al. |
| 5,727,229 A | 3/1998 | Kan et al. |
| 5,737,572 A | 4/1998 | Nunziata |
| 5,737,749 A | 4/1998 | Patel et al. |
| 5,742,804 A | 4/1998 | Yeh et al. |
| 5,752,068 A | 5/1998 | Gilbert |
| 5,758,112 A | 5/1998 | Yeager et al. |
| 5,758,176 A | 5/1998 | Agarwal et al. |
| 5,774,685 A | 6/1998 | Dubey |
| 5,774,686 A | 6/1998 | Hammond et al. |
| 5,778,241 A | 7/1998 | Bindloss et al. |
| 5,781,750 A | 7/1998 | Blomgren et al. |
| 5,790,877 A | 8/1998 | Nishiyama et al. |
| 5,794,062 A | 8/1998 | Baxter |
| 5,805,907 A | 9/1998 | Loper |
| 5,805,915 A | 9/1998 | Wilkerson et al. |
| 5,812,811 A | 9/1998 | Dubey et al. |
| 5,822,606 A | 10/1998 | Morton |
| 5,848,290 A | 12/1998 | Yoshida et al. |
| 5,854,934 A | 12/1998 | Hsu et al. |
| 5,857,104 A | 1/1999 | Natarjan et al. |
| 5,864,697 A | 1/1999 | Shiell |
| 5,864,707 A | 1/1999 | Tran et al. |
| 5,870,581 A | 2/1999 | Redford |
| 5,872,987 A | 2/1999 | Wade et al. |
| 5,875,324 A | 2/1999 | Tran et al. |
| 5,875,464 A | 2/1999 | Kirk |
| 5,884,057 A | 3/1999 | Blomgren et al. |
| 5,887,166 A | 3/1999 | Mallick et al. |
| 5,903,750 A | 5/1999 | Yeh et al. |
| 5,924,117 A | 7/1999 | Luick |
| 5,926,642 A * | 7/1999 | Favor ................. 712/1 |
| 5,930,490 A | 7/1999 | Bartkowiak |
| 5,930,509 A | 7/1999 | Yates et al. |
| 5,933,650 A | 8/1999 | van Hook et al. |
| 5,933,860 A | 8/1999 | Emer |
| 5,946,222 A | 8/1999 | Redford |
| 5,949,995 A | 9/1999 | Freeman |
| 5,960,467 A | 9/1999 | Mahalingaiah et al. |
| 5,966,544 A | 10/1999 | Sager |
| 5,991,857 A | 11/1999 | Koetje et al. |
| 5,996,061 A | 11/1999 | Lopez-Aguado et al. |
| 6,006,328 A * | 12/1999 | Drake ............... 726/23 |
| 6,021,484 A * | 2/2000 | Park ................. 712/41 |
| 6,044,469 A | 3/2000 | Horstmann |

(56) References Cited

U.S. PATENT DOCUMENTS

| | | | |
|---|---|---|---|
| 6,049,330 A | 4/2000 | Redford | |
| 6,052,703 A | 4/2000 | Redford | |
| 6,058,469 A | 5/2000 | Baxter | |
| 6,067,609 A | 5/2000 | Mecker et al. | |
| 6,067,622 A | 5/2000 | Moore et al. | |
| 6,076,158 A | 6/2000 | Sites et al. | |
| 6,078,745 A | 6/2000 | De Greef et al. | |
| 6,089,460 A | 7/2000 | Hazama | |
| 6,105,139 A | 8/2000 | Dey et al. | |
| 6,108,775 A | 8/2000 | Shiell et al. | |
| 6,119,205 A | 9/2000 | Wicki et al. | |
| 6,121,905 A | 9/2000 | Redford | |
| 6,130,631 A | 10/2000 | Redford | |
| 6,175,892 B1 | 1/2001 | Sazzad et al. | |
| 6,178,498 B1 | 1/2001 | Sharangpani et al. | |
| 6,211,864 B1 | 4/2001 | Redford | |
| 6,212,542 B1 | 4/2001 | Kahle et al. | |
| 6,216,223 B1 | 4/2001 | Revilla et al. | |
| 6,219,796 B1 | 4/2001 | Bartley | |
| 6,256,743 B1 | 7/2001 | Lin | |
| 6,272,512 B1 | 8/2001 | Golliver et al. | |
| 6,272,676 B1 | 8/2001 | Haghighat | |
| 6,282,623 B1 | 8/2001 | Halahmi et al. | |
| 6,282,628 B1 | 8/2001 | Dubey et al. | |
| 6,282,639 B1 | 8/2001 | Puziol et al. | |
| 6,286,135 B1 | 9/2001 | Santhanam | |
| 6,289,505 B1 | 9/2001 | Goebel | |
| 6,292,879 B1 | 9/2001 | Fong | |
| 6,301,705 B1 | 10/2001 | Doshi et al. | |
| 6,327,661 B1 | 12/2001 | Kocher et al. | |
| 6,334,175 B1 | 12/2001 | Chih | |
| 6,341,371 B1 | 1/2002 | Tandri | |
| 6,381,668 B1 | 4/2002 | Lunteren | |
| 6,385,720 B1 | 5/2002 | Tanaka et al. | |
| 6,393,520 B2 | 5/2002 | Yoshikawa | |
| 6,404,439 B1 | 6/2002 | Coulombe et al. | |
| 6,412,105 B1 | 6/2002 | Maslennikov | |
| 6,430,674 B1 | 8/2002 | Trivedi et al. | |
| 6,430,693 B2 | 8/2002 | Lin | |
| 6,446,181 B1 | 9/2002 | Ramagopal et al. | |
| 6,452,864 B1 | 9/2002 | Condemi et al. | |
| 6,473,339 B2 | 10/2002 | De Ambroggi et al. | |
| 6,477,646 B1 | 11/2002 | Krishna et al. | |
| 6,487,640 B1 | 11/2002 | Lipasti | |
| 6,487,651 B1 | 11/2002 | Jackson et al. | |
| 6,502,188 B1 | 12/2002 | Zuraski, Jr. et al. | |
| 6,529,943 B1 | 3/2003 | Ohi | |
| 6,539,543 B1 | 3/2003 | Guffens | |
| 6,550,004 B1 | 4/2003 | Henry et al. | |
| 6,560,776 B1 | 5/2003 | Breggin et al. | |
| 6,571,331 B2 | 5/2003 | Henry et al. | |
| 6,574,740 B1 | 6/2003 | Odaohhara | |
| 6,601,161 B2 | 7/2003 | Rappoport et al. | |
| 6,611,910 B2 | 8/2003 | Sharangpani et al. | |
| 6,625,740 B1 | 9/2003 | Datar | |
| 6,643,739 B2 | 11/2003 | Van de Waerdt et al. | |
| 6,658,578 B1 | 12/2003 | Laurenti et al. | |
| 6,671,798 B1 | 12/2003 | Puziol et al. | |
| 6,675,298 B1 * | 1/2004 | Folmsbee | 713/190 |
| 6,675,305 B1 | 1/2004 | Mohammad | |
| 6,687,838 B2 | 2/2004 | Orenstien et al. | |
| 6,732,253 B1 | 5/2004 | Redford | |
| 6,772,323 B2 | 8/2004 | Krishnan et al. | |
| 6,795,781 B2 | 9/2004 | Aldridge et al. | |
| 6,813,693 B2 | 11/2004 | Chilimbi | |
| 6,826,652 B1 | 11/2004 | Chauvel et al. | |
| 6,931,518 B1 | 8/2005 | Redford | |
| 6,934,865 B2 | 8/2005 | Moritz et al. | |
| 6,970,985 B2 | 11/2005 | Moritz et al. | |
| 6,988,183 B1 | 1/2006 | Wong | |
| 7,024,393 B1 | 4/2006 | Peinado et al. | |
| 7,036,118 B1 | 4/2006 | Ulery et al. | |
| 7,080,366 B2 | 7/2006 | Kramskoy et al. | |
| 7,089,594 B2 | 8/2006 | Lai et al. | |
| 7,162,617 B2 | 1/2007 | Ota et al. | |
| 7,185,215 B2 | 2/2007 | Cook et al. | |
| 7,278,136 B2 | 10/2007 | Moritz et al. | |
| 7,293,164 B2 | 11/2007 | DeWitt et al. | |
| 7,299,500 B1 | 11/2007 | Klebe et al. | |
| 7,430,670 B1 | 9/2008 | Horning et al. | |
| 7,467,377 B2 | 12/2008 | Wu et al. | |
| 7,487,340 B2 | 2/2009 | Luick | |
| 7,493,607 B2 | 2/2009 | Moritz | |
| 7,564,345 B2 | 7/2009 | Devadas et al. | |
| 7,600,265 B2 | 10/2009 | Davydov et al. | |
| 7,613,921 B2 | 11/2009 | Scaralata | |
| 7,639,805 B2 | 12/2009 | Li et al. | |
| 7,676,661 B1 | 3/2010 | Mohan et al. | |
| 7,996,671 B2 | 8/2011 | Chheda et al. | |
| 2001/0032309 A1 | 10/2001 | Henry et al. | |
| 2001/0037450 A1 | 11/2001 | Metlitski et al. | |
| 2001/0044891 A1 | 11/2001 | McGrath | |
| 2001/0056531 A1 | 12/2001 | McFarling | |
| 2002/0073301 A1 | 6/2002 | Kahle et al. | |
| 2002/0095566 A1 | 7/2002 | Sharangpani et al. | |
| 2002/0104077 A1 | 8/2002 | Charnell et al. | |
| 2002/0116578 A1 | 8/2002 | Sakai et al. | |
| 2003/0014742 A1 | 1/2003 | Seth et al. | |
| 2003/0041230 A1 | 2/2003 | Rappoport et al. | |
| 2003/0066061 A1 | 4/2003 | Wu et al. | |
| 2004/0010679 A1 | 1/2004 | Moritz et al. | |
| 2004/0010782 A1 | 1/2004 | Moritz et al. | |
| 2004/0010783 A1 | 1/2004 | Moritz et al. | |
| 2004/0015923 A1 | 1/2004 | Hemsing et al. | |
| 2004/0139340 A1 | 7/2004 | Johnson et al. | |
| 2004/0154011 A1 | 8/2004 | Wang et al. | |
| 2004/0158691 A1 | 8/2004 | Redford | |
| 2004/0162964 A1 | 8/2004 | Ota et al. | |
| 2004/0205740 A1 | 10/2004 | Lavery et al. | |
| 2005/0055678 A1 | 3/2005 | Sakai | |
| 2005/0066153 A1 | 3/2005 | Sharangpani et al. | |
| 2005/0069138 A1 * | 3/2005 | de Jong | G06F 9/3017 380/278 |
| 2005/0108507 A1 | 5/2005 | Chheda et al. | |
| 2005/0114850 A1 | 5/2005 | Chheda et al. | |
| 2005/0154867 A1 | 7/2005 | DeWitt et al. | |
| 2005/0172277 A1 | 8/2005 | Chheda et al. | |
| 2005/0210249 A1 | 9/2005 | Lee et al. | |
| 2005/0262329 A1 * | 11/2005 | Krishnan et al. | 712/210 |
| 2005/0262332 A1 | 11/2005 | Rappoport et al. | |
| 2006/0179329 A1 | 8/2006 | Terechko et al. | |
| 2007/0294181 A1 | 12/2007 | Chheda et al. | |
| 2008/0126766 A1 | 5/2008 | Moritz et al. | |
| 2009/0300590 A1 | 12/2009 | Moritz et al. | |
| 2011/0258416 A1 | 10/2011 | Moritz et al. | |
| 2012/0102336 A1 | 4/2012 | Chheda et al. | |
| 2013/0151865 A1 | 6/2013 | Moritz et al. | |

FOREIGN PATENT DOCUMENTS

| | | |
|---|---|---|
| EP | 0679991 | 11/1995 |
| EP | 0945783 | 9/1999 |
| EP | 0681236 | 11/2000 |
| GB | 2201015 | 8/1988 |
| JP | 10-289305 | 10/1998 |
| JP | 2002-7359 | 1/2002 |
| WO | WO87/00318 | 1/1987 |
| WO | WO91/19269 | 12/1991 |
| WO | WO93/04438 | 3/1993 |
| WO | WO99/14685 | 3/1999 |
| WO | WO02/39271 | 5/2002 |
| WO | WO02/39272 | 5/2002 |
| WO | WO02/44895 | 6/2002 |
| WO | WO02/46885 | 6/2002 |
| WO | WO2004/006060 | 1/2004 |

OTHER PUBLICATIONS

Actel corporation, "Design Security in Nonvolatile Flash and Antifuse FPGAs Security Backgrounder", [online] Retrieved from the Internet: URL<http://www.actel.com/documents/DesignSecurity_WP.pdf> [retrieved on Feb. 22, 2011] (2002).

(56) References Cited

OTHER PUBLICATIONS

ARM Architecture Reference Manual—ARM DDI 0100E, pp. A4-28 and A4-82 ( (c) 1996-2000 ).
Athanas et al., "Processor Reconfiguration Through Instruction-Set Metamorphosis", IEEE / Computer Magazine, v. 26(3), pp. 11-18 (1993).
Mirsky et al., "Matrix: A Reconfigurable Computing Architecture with Configurable Instruction Distribution and Deployable Resources", Proc. of the IEEE Symposium on FPGSs for Custom Computing Machines, pp. 157-166 (1996).
Schneier et al., "Applied Cryptography, 2nd Ed.", pp. 13 and 270-278, John Wiley & Sons, Inc., (pub.), (1996).
Abraham et al., "Automatic and Efficient Evaluation of Memory Hierarchies for Embedded Systems," micro, p. 114, 32nd Annual IEEE/ACM International Symposium on Microarchitecture (MICRO'99), (1999).
Abstract search, "SIMD Processor" (dated Mar. 21, 2003).
Advanced Micro Devices, Inc., "Quantispeed Architecture", AMD White Paper, Sunnyvale, CA, (2001).
Aho et al., Compilers: Principles, Techniques and Tools, Addison-Wesley, Reading, MA (1988).
Akkar et al., "An Implementation of DES and AES, Secure Against Some Attacks", CHES2001, LNCS 2162, pp. 309-318 (2001).
Albonesi et al., "Selective Cache Ways: On-Demand Cache Resource Allocation", Proceedings of the 32nd International Symposium on Microarchitecture, pp. 248-259 (Nov. 1999).
Al-Tawil, K. et al. "Performance Modeling and Evaluation of MPI", Journal of Parallel and Distributed Computing, vol. 61, pp. 202-223, (2001).
Andersen, L., "Program Analysis and Specialization for the C Programming Language", Ph.D. Thesis, DIKU, Univ. of Copenhagen (May 1994).
Anderson et al., "Physical Design of a Fourth-Generation Power GHz Microprocessor", Digest of Technical Papers, IEEE Int'l Solid State Circuits Conf., pp. 232-233 and 451 (2001).
ANSI x9.17, "American national standard for financial institution key management (wholesale)", Tech. Rep., American Bankers Assoc. (1985).
Antoniou, A., "Digital Filters: Analysis, Design & Applications", McGraw-Hill, New York, NY (1993).
Aragon, et al., "Power-aware Control Speculation Through Selective Throttling," Proceedings of 9th International Symposium on High Performance Computer Architecture (HPCA), (2003).
Ashok et al., "Cool-Mem: Combining Statically Speculative Memory Accessing with Selective Address Translation for Energy Efficiency", in Proceedings of the 10th international conference on Architectural Support for Programming Languages and Operating Systems (ASPLOS 2002), pp. 133-143, San Jose, CA, (Oct. 2002).
Ashok et al., "Coupling Compiler-Enabled and Conventional Memory Accessing for Energy Efficiency", ACM Transactions on Computer Systems (TOCS), vol. 22, No. 2, pp. 180-213, (May 2004).
Ashok et al., "Network Software: From NCP to Ubiquitous Computing", Encyclopedia of Life Support Systems, (2001).
Babb et al., "Parallelizing Applications into Silicon", The 7th Annual IEEE Symposium on Field-Programmable Custom Computing Machines, FCCM'99, Napa, CA (Apr. 1999).
Bahar et al., "Power and Energy Reduction via Pipeline Balancing", IEEE, 12 pgs., (2001).
Banerjee et al., "Fast execution of loops with IF statements", IEEE vol. 84, pp. 126-132 (1984).
Baniasadi et al., "Instruction Flow-Based Front-end Throttling for Power-Aware High-Performance Processors", (ISLPED '01), ACM, pp. 16-21, (2001).
Bechade et al., "A 32b 66MHz 1.8W Microprocessor", Digest of Technical Papers, IEEE, pp. 208-209, (1994).
Bellas et al., "Architectural and Compiler Techniques for Energy Reduction in High-Performance Microprocessors", IEEE Trans. On Very Large Scale Integration Systems, vol. 8(3), pp. 317-326 (2000).
Bellas et al., Using Dynamic Cache Management Technique to Reduce Energy in Genearl Purpose Processors, pp. 693-708, (2000).
Ben Naser et al., "A Step-by-Step Design and Analysis of Low Power Caches for Embedded Processors", Boston Area Architecture Workshop (BARC-2005), (Jan. 2005).
Ben Naser, M., "Data Memory Subsystem Resilient to Process Variations", PHD Thesis, (Jan. 2008).
Ben Naser, M., "Designing Memory Subsystems Resilient to Process Variations", IEEE Computer Society Annual Symposium on VLSI (ISVLSI 2007), Brazil, (May 2007).
Ben Naser, M., "Power and Failure Analysis of Cam Cells Due to Process Variations", Proc. of 13th IEEE International Conference on Electronics, Circuits and Systems (ICECS'06), Nice, France, (Dec. 2006).
Benini, et al., "A Recursive Algorithm for Low-Power Memory Partitioning", (ISLPED'00), ACM pp. 78-83 (2000).
Biham et al., "Differential Cryptanalysis of DES-like Cryptosystems", J. Cryptology, vol. 4, pp. 3-72 (1991).
Brooks et al., "Wattch: A Framework for Architectural-Level Power Analysis and Optimizations", Proceedings of the 27th International Symposium on Computer Architecture (ISCA '00); ACM, pp. 83-94, (2000).
Burger et al., "The SimpleScalar Tool Set, Version 2.0", Computer Sciences Dept., Univ. of Wisconsin-Madison, Technical Report 1342, pp. 13-25 (1997).
Bursky, D., "Advanced DRAM architectures overcome data bandwidth limits", Electron. Des., vol. 45, pp. 73-88 (1997).
Burtscher et al., "Static Load Classification for Improving the value Predictability of Data-Cache Misses", ACM (2000), pp. 222-233.
Buyuktosunoglu et al., "An Adaptive Issue Queue for Reduced Power at High Performance" Power-Aware Computer Systems, First International Workshop, PACS 2000, pp. 25-39 (2000).
Calder et al. "Next Cache Line and Set Prediction." Proceedings of the 1995 International Computer Symposium on Computer Architecture, ACM, pp. 287-296 (1995).
Calder et al., "Fast & Accurate Instruction Fetch and Branch Prediction", IEEE, pp. 2-11 (1994).
Cantin et al., "Cache Performance for Selected Spec CPU2000 Benchmarks" Computer Architecture News, 29(4):13-18 (2001).
Chang et al., "Protecting Software Code by Guards", Proc. ACM Workshop on Security and Privacy in Digital Rights management (SPDRM), LNCS 2320, pp. 160-175 (2002).
Chheda et al., "Combining compiler and runtime IPC predictions to reduce energy in next generation architectures", Proceedings of the First Conference on Computing Frontiers, pp. 240-254, Italy, (Apr. 2004).
Chheda et al., "Memory Systems: Overview and Trends", Encyclopedia of Life Support Systems, (2001).
Chase et al., "Lightweight Shares Objects in a 64-Bit Operating System", Univ. of Washington, Dept. of Computer Science & Engineering, Technical Report Mar. 9, 1992, Seattle, WA (Jun. 1992).
Chiou et al., "Application-Specific Memory Management for Embedded Systems Using Software-Controlled Caches", (DAC'00), ACM, pp. 416-419 (2000).
Cohn et al., "Optimizing Alpha Executables on Windows NT with Spike", Digital Technical Journal, vol. 9(4), pp. 3-20 (1997).
Collins, L. "Power drops focus the minds at ARM", EE Times (2002), [online] Retrieved from the Internet:<URL: http://eetimes.eu/uk/16505609> [retrieved on Aug. 28, 2008].
Compaq Computer Corporation, "Compiler Writer's Guide for the Alpha 21264", Digital Equipment Corporation ( © 1999).
Cooper et al., "Compiler-Controlled Memory", ASPLOS VIII; ACM, 33(11):2-11 (1998).
Cosoroba, A., "Double Data Rate Synchronous DRAMS in High Performance Applications", WESCON'97 IEEE Conference Proceedings, pp. 387-391, (1997).
Cortadella et al., "Evaluation of A+B=K Conditions Without Carry Propagation", IEEE Trans. on Computers, vol. 41(11), pp. 1484-1488 (Nov. 1992).
Cowell et al., "Improved Modeling and Data-Migration for Dynamic Non-Uniform Cache Access", In WDD2 2003 organized in conjunction with ISCA (2003).

(56) References Cited

OTHER PUBLICATIONS

Daemen et al., "The Rijndael Block Cipher—AES Proposal", [online] Tech. Rep., [retrieved on Apr. 1, 2008], Retrieved from the Internet: <URL:http://csrc.nist.gov/encryption/aes/round2/r2algs.htm> (Mar. 9, 1999).
Deitrich et al., "Speculative Hedge: Regulating Compile-Time Speculation Against Profile Variations", IEEE, pp. 70-79, (1996).
Delaluz et al., "Energy-Oriented Compiler Optimizations for Partitioned Memory Architectures", International Conference on Compilers, Architecture and Synthesis for Embedded Systems, Proceedings of the 2000 international conference on Compilers, architecture, and synthesis for embedded systems, San Jose, CA, 10 pps., (2000).
Desmet et al., "Improved Static Branch Prediction for Weak Dynamic Predictions", Retrieved from the Internet: <URL: http://escher.elis.ugent.be/publ/Edocs/DOC/P103_085.pdf>, pp. 1-3, (Sep. 2003).
Folegnani et al., "Energy-Effective Issue Logic", IEEE, 10 pgs. (2001).
Frank et al., "SUDS: Primitive Mechanisms for Memory Dependence Speculation", Technical Report. LCS-TM-591, (Oct. 1998).
Furber et al., "ARM3-32b RISC Processor with 4 KByte On-Chip Cache", VLSI'89, Elsevier, pp. 35-44 (1989).
Furber et al., "Power Saving Features in AMULET2e", In Power Driven Microarchitecture Workshop at 25th Annual International Symposium on Computer Architecture, Barcelona, Spain, 4 pgs. (Jun. 1998).
Gandolfi et al., "Electromagnetic Analysis: Concrete Results", Workshop of Cryptographic Hardware and Embedded Systems (CHES'01), LNCS 2162, pp. 251-261 (2001).
Gassend et al., "Controlled Physical Random Functions", Proc. 18th Ann. Computer Security Applications Conf. [online] Retrieved from the Internet:<URL:http://csg.csail.mit.edu/pubs/memos/Memo457/memo-457.pdf> [retrieved on Feb. 22, 2011] (2002).
Ghiasi et al., "Using IPC Variation in Workloads with Externally Specified Rates to Reduce Power Consumption", In Workshop on Complexity Effective Design, Vancouver, Canada, pp. 1-10 (Jun. 2000).
Gilmont et al., "Hardware Security for Software Privacy Support", Electronics Lett., vol. 35(24), pp. 2096-2097 (1999).
Gilmont et al., "An Architecture of security management unit for safe hosting of multiple agents", Proc. of the Int'l Workshop on Intelligent Communicatinos and Multimedia Terminals, [online] Retrieved from the Internet:<URL:http://citeseerx.ist.psu.edu/viewdoc/download?doi=10.1.1.140.6346&rep=rep1&type=pdf> [retrieved on Feb. 22, 2011] (Nov. 1998).
Gowan et al., "Power Considerations in the Design of the Alpha 21264 Microprocessor", (DAC 98), ACM, pp. 726-731 (1998).
Grand, J., "Attacks on and Countermeasures for USB Hardware Token Devices", Proc. Fifth Nordic Workshop on Secure IT Systems [online] Retrived from the Internet:<URL:http://citeseerx.ist.psu.edu/viewdoc/download;jsessionid=98145A989F0A335F16702C1EA12F0819?doi=10.1.1.16.540&rep=rep1&type=pdf> [retrieved on Feb. 22, 2011] (2000).
Grant et al., "Annotation-Directed Run-Time Specialization in C", ACM, pp. 163-178, (1997).
Guo et al., "Compiler-Enabled Cache Management for Pointer-Intensive Programs", Boston Area Architecture Workshop (BARC-2003), (Jan. 2003).
Guo et al., "Energy Characterization of Hardware-Based Data Prefetching", Proc. of the IEEE Intl. Conference on Computer Design (ICCD'04), pp. 518-523, (Oct. 2004).
Guo et al., "Energy-Aware Data Prefetching for General-Purpose Programs", Proc. of PACS'04 Workshop on Power-Aware Computer Systems, Micro-37, Lecture Notes in Computer Science, (Dec. 2004).
Guo et al., "PARE: A Power-Aware Data Prefetching Engine", Proc. of International Symposium on Low Power Electronics and Design (ISLPED'05), San Diego, CA, (Aug. 2005).
Guo et al., "Runtime Biased Pointer Analysis and Its Application on Energy Efficiency", Proc. of Workshop on Power-Aware Computer Systems (PACS'03), Micro-36, San Diego, CA; also in Lecture Notes in Computer Science, vol. 3164, pp. 1-12, Springer 2004, ISBN 3-540-24031-4, (Dec. 2003).
Guo et al., "Synchronization Coherence: A Transparent Hardware Mechanism for Cache Coherence and Fine-Grained Synchronization", accepted by Journal of Parallel and Distributed Computing (JPDC), (2007).
Guo, Y., "Compiler-Assisted Hardware-Based Data Prefetching for Next Generation Processors", PHD Thesis, (May 2007).
Gutmann, P., "Data Remanence in Semiconductor Devices", Proc. of the 10th USENIX Security Symposium, 17 pgs. (2001).
Gutmann, P., "Secure Deletion of Data from Magnetic and Solid-State Memory", Proc. of the 6th USENIX Security Symposium, 18 pgs. (1996).
Harvard University / Michael D. Smith's Research Group on Compilation and Computer Architecture; [online] Retrieved from the Internet:<URL:http://www.eecs.harvard.edu/hube/software/software.html> [retrieved on May 4, 2004], ( © 1999).
Heinrich, J., MIPS R10000 Microprocessor's User Manual, 2nd Ed., MIPS Technologies, Inc. (1996).
Heinrich, J., MIPS R4000 Microprocessor User's Manual, 2nd Ed., MIPS Technologies, Inc. (1994).
Hennessey et al., "Enhancing Vector Performance", Computer Architecture, a Qualitative Approach, Second Edition, Section 5, pp. B23-B29 (1996).
Henry et al., "Circuits for Wide-Window SuperScalar Processors" (ISCA'00), ACM, pp. 236-247 (2000).
Hinton et al., "The Microarchitecture of the Pentium 4 Processor", Intel Technology Journal Q1, pp. 1-12 (2001).
Huang et al., "Speculative Disambiguation: A Compilation Technique for Dynamic Memory Disambiguation", IEEE, pp. 200-210, (1994).
Huang et al., "L1 Data Cache Decomposition for Energy Efficiency", (ISLPED'01), ACM, pp. 10-15 (2001).
IBM, "Single-Bit Processor Enable Scheme", IBM Technical Disclosure Bulletin, vol. 29, No. 11, pp. 5016-5017 (Apr. 1987).
Inoue et al., "Way-Predicting Set-Associative Cache for High Performance and Low Energy Consumption", (ISLPED'99), ACM, pp. 273-275 (1999).
Intel, "Intel StrongARM* SA-1110 Microprocessor", Sa-1110 Brief Datasheet, pp. 1-9 (2000).
Intel 80386 Programmer's Reference Manual (1986).
Itoh et al., "DPA Countermeasure Based on 'Masking Method'", ICICS 2001, LNCS 2288, pp. 440-456 (2002).
Jain et al., "A 1.2Ghz Alpha Microprocessor with 44.8GB/s Chip Pin Bandwidth", IEEE, pp. 240-241 (2001).
Kaxiras et al., "Cache Decay: Exploiting Generational Behavior to Reduce Cache Leakage Power", IEEE, pp. 240-251 (2001).
Kean, T., "Secure Configuration of Field-Programmable Gate Arrays", Proc. of the 11th Int'l Conf. on Field-Programmable Logic and Applications [online] Retrieved from the Internet:<URL: http://citeseerx.ist.psu.edu/viewdoc/download?doi=10.1.1.86.2017&rep=rep1&type=pdf> [retrieved on Feb. 22, 2011] (2001).
Kelsey et al., "Side Channel Cryptanalysis of Product Ciphers", Proc. ESORIC'98, pp. 97-110 (1998).
Kever et al., "A 200MHz RISC Microprocessor with 128kB On-Chip Caches", IEEE, pp. 410, 411 and 495 (1997).
Kim et al., "Predictive Precharging for Bitline Leakage Energy Reduction", 15th Annual IEEE Int'l. ASIC/SOC Conference, pp. 36-40 (2002).
Kim et al., "Partitioned Instruction Cache Architecture for Energy Efficiency", ACM Trans. on Embedded Computing Systems, v.2(2), pp. 163-185 (May 2003).
Kin et al., "The Filter Cache: An Energy Efficient Memory Structure", IEEE, pp. 184-193 (1997).
Kocher et al., "Differential Power Analysis", CRYPT0'99, LNCS 1666, 10 pgs. (1999).
Kocher et al., "Timing Attacks on Implementations of Diffie-Hellmann, RSA, DSS and Other Systems", Adv. in Cryptology (CRYPTO'96), 10 pgs. (1996).

(56) References Cited

OTHER PUBLICATIONS

Kommerling et al., "Design Principles for Tamper-Resistant Smartcard Processors", USENIX Workshop on Smartcard Technology, 12 pgs. (1999).
Kowalczyk et al., "First-Generation MAJC Dual Processor", IEEE, pp. 236-237 and 451 (2001).
Kuhn et al., "Tamper Resistance—A Cautionary Note", Proc. of the 2nd USENIX Workshop on Electronics Commerce, 11 pgs. (1996).
Kuhn, M., "Optical Time-Domain Easvesdropping Risks of CRT Displays", Proc. of the 2002 IEEE Symp. on Security and Privacy [online] Retrieved from the Internet:<URL:http://www.cl.cam.ac.uk/~mgk25/ieee02-optical.pdf> [retrieved on Feb. 22, 2011] (May 2002).
Kuhn et al., "Soft Tempest: Hidden Data Transmission Using Electromagnetic Emanations", Proc. of 2nd Int'l Workshop on Information Hiding [online] Retrieved from the Internet:<URL:http://www.cl.cam.ac.uk/~mgk25/ih98-tempest.pdf> [retrieved on Feb. 22, 2011] (1998).
Kulkarni et al., "Advanced Data Layout Optimization for Multimedia Applications", Lecture Notes in Computer Science; vol. 1800, Proceedings of the 15 IPDPS 2000 Workshops on Parallel and Distributed Processing, 8 pps. (2000).
Lam et al., "Limits of Control Flow on Parallelism", ACM, pp. 46-57 (1992).
Larsen et al., "Exploiting Superword Level Parallelism With Multimedia Instruction Sets", (PLDI'00), ACM, pp. 145-156 (2000).
Lee et al., "MediaBench: A Tool for Evaluating and Synthesizing Multimedia and Communications Systems", International Symposium on Microarchitecture, pp. 330-335 (1997).
Lee et al., "Region-Based Caching: An Energy-Delay Efficient Memory Architecture for Embedded Processors." (CASES '00) ACM, pp. 120-127 (2000).
Leenstra et al., "A 1.8 GHz Instruction Buffer", IEEE, pp. 314-315 and 459 (2001).
Levinthal et al., "Chap—A SIMD Graphics Processor", Computer Graphics, vol. 18(3), (Jul. 1984).
Lie et al., "Architectural Support for Copy and Tamper Resistant Software", Proc. of the 6th Int'l Conf. Architectural Support for Programming Languages and Operating Systems, ACM, 10 pgs. (2000).
Loughry et al., "Information Leakage from optical Emanations", ACM Trans. on Information and System Security, vol. 5(3), 28 pgs. (2002).
MAC OS Runtime Architectures for System 7 Through MAC OS 9, Ch. 7, [online] Retrieved from the Internet: <URL:http://developer.apple.com/documentation/mac/pdf/MacOS_RT_Architectures.pdf> [retrieved on Aug. 13, 2009], (Pub. Jan. 31, 1997 (c) Apple Inc.).
Manne et al., "Pipeline Gating: Speculation Control for Energy Reduction", IEEE, pp. 132-141 (1998).
Marculescu, D., "Profile-Driven Code Execution for Low Power Dissipation", (ISPLED'00) ACM, pp. 253-255 (2000).
Maro et al., "Dynamically Reconfiguring Processor Resources to Reduce Power Consumption in High-Performance Processors, Workshop on Power-Aware Computer Systems", (PACS '00 / LNCS 2008) ACM, pp. 97-111 (2001).
Memik et al., "A Selective Hardware/Compiler Approach for Improving Cache Locality", Center for Parallel and Distributed Computing, Northwestern University; pp. 1-21 (2000).
Menezes et al., "Handbook of Applied Cryptography", CRC Press (CRC Press Series on Discrete Mathematics and Its Applications), (1997).
Messerges et al., "Examining Smart Card Security Under the Threat of Power Analysis Attacks", IEEE Trans. on Computers, vol. 51(5), pp. 541-552 (2002).
Michaud et al. "Data-Flow Prescheduling for Large Instructions Windows in Out-of-Order Processors, 7th International", IEEE, pp. 27-36 (2001).
MICRO'34 (2001).

Milutinovic et al., "The Split Temporal/Spatial Cache: Initial Performance Analysis", Proceedings of the SCIzzL-5, 8 pps. (1996).
Montanaro et al., "A 160 MHz, 32b, 0.5-W CMOS RISC Microprocessor", IEEE, 31(11):1703-1714 (1996).
Moritz et al., "Adaptive Distributed Software Virtual Memory for Raw", Laboratory for Computer Science, Raw group, MIT, Cambridge, MA, (Jan. 1999).
Moritz et al., "Exploring Cost-Performance Optimal Designs of Raw Microprocessors", The 6th Annual IEEE Symposium on Field-Programmable Custom Computing Machines FCCM'98., Napa, California, (Apr. 1998).
Moritz et al., "Fault-Tolerant Nanoscale Processors on Semiconductor Nanowire Grids", IEEE Transactions on Circuits and Systems I, special issue on Nanoelectronic Circuits and Nanoarchitectures, vol. 54, iss. 11, pp. 2422-2437, (Nov. 2007).
Moritz et al., "FlexCache: A Framework for Flexible Compiler Generated Data Caching", Proc. of the 2nd Intelligent Memory Workshop, IRAM00, Cambridge, MA, (Nov. 2000).
Moritz et al., "Hot Pages: Design and Implementation of Software Caching for Raw", IBM Research Lab Austin, (May 1999).
Moritz et al., "Latching on the Wire and Pipelining in Nanoscale Designs", 3rd Workshop on Non-Silicon Computation (NSC-3), ISCA'04, Germany, (Jun. 2004).
Moritz et al., "LoGPC: Modeling Network Contention in Message-Passing Programs", ACM Joint International Conference on Measurement and Modeling of Computer Systems, ACM SIGMETRICS/PERFORMANCE 98 Wisconsin Madison, Jun. 1998, also in ACM Performance Evaluation Review Special Issue vol. 26 No. 1, (1998).
Moritz et al., "LOGPC: Modeling Network Contention in Message-Passing Programs", IEEE Transactions on Parallel and Distributed Systems, vol. 12, No. 4, pp. 404-415, (Apr. 2001).
Moritz et al., "Security Tradeoffs in NEST", DARPA Presentation, (Dec. 2003).
Moritz et al., "SimpleFit: a Framework for Analyzing Design Tradeoffs in Raw Architectures", IEEE Transactions on Parallel and Distributed Systems, vol. 12, No. 7, pp. 730-742, (Jul. 2001).
Moritz et al., "Towards Defect-tolerant Nanoscale Architectures", Invited Paper, IEEE Nano2006, (2006).
Moritz et al., "Hot Pages: Software Caching for Raw Microprocessors", International Symposium for Computer Architecture (ISCA-27), Massachusetts Institute of Technology, Cambridge, MA, pp. 1-9 (1999).
Mueller et al., "Predicting Instruction Cache Behavior", ACM SIGPLAN Workshop on Language, Compiler * Tool Support for Real-Time Systems (Jun. 1004).
Narayanan et al., "CMOS Control Enabled Single-Type FET NASIC", Best Paper Award, IEEE Computer Society Annual Symposium on VLSI 2008, (2008).
Narayanan et al., "Comparison of Analog and Digital Nano-Systems: Issues for the Nano-Architect", IEEE International Nanoelectronics Conference (INEC), (2008).
Narayanan et al., "Image Processing Architecture for Semiconductor Nanowire based Fabrics", accepted by IEEE 8th International Conference on Nanotechnology, (2008).
National Bureau of Standards, "Data Encryption Standard", Tech. Rep. NBS FIPS Pub. 46, Nat'l Bur. Standards, US Dept. of Commerce (Jan. 1977).
Nicolau et al., "Measuring the Parallelism Available for Very Long Instruction Word Architectures", IEEE Transactions on Computers, 33(11):968-976, (1984).
Ors et al., "Power-Analysis Attack on an ASIC AES Implementation", Proc. of Int'l Symp. on Information Tech. [online] Retrieved from the Internet:<URL:http://citeseerx.ist.psu.edu/viewdoc/download?doi=10.1.1.88.2697&rep=rep1&type=pdf> [retrieved on Feb. 22, 2011] (ITCC 2004).
Oppenheim, A. et al., "Discrete-Time Signal Processing", Prentice-Hall, Upper Saddle River, NJ (1999).
Palacharla et al., "Complexity-Effective Superscalar Processors", (ISCA'97) ACM, pp. 206-218, (1997).
Panda et al., "Efficient Utilization of Scratch-Pad Memory in Embedded Processor Applications", IEEE, pp. 7-11, (1997).

(56) References Cited

OTHER PUBLICATIONS

Parikh et al., "Power Issues Related to Branch Prediction", (HPCA'02) IEEE, 12 pgs., (2002).
Pering et al., "Dynamic Voltage Scaling and the Design of a Low-Power Microprocessor System", In Power Driven Microarchitecture Workshop, attached to ISCA98, (Jun. 1998).
Ponomarev et al., "Reducing Power Requirements of Instruction Scheduling Through Dynamic Allocation of Multiple Datapath Resources", IEEE, pp. 90-101 (2001).
Postiff et al., "The Limits of Instruction Level Parallelism in SPEC95 Applications", Computer Architecture News, vol. 217(1). 10 pgs, (1999).
Powell et al., "Reducing Set-Associative Cache Energy via Way-Prediction and Selective Direct-Mapping", IEEE, pp. 54-65, (2001).
PowerPC Upgrade FAQ Powerbook 500 Series PPC Upgrade from IMAX [online], Retrieved from the Internet: <URL:http://www.darryl.com/ppcfaq.html> [retrieved on Aug. 13, 2009], (dated Jan. 28, 1997).
Prasad et al., "Efficient Search Techniques in the Billion Transistor Era", Invited paper, appears in PDPTA, Las Vegas, NV, (2001).
Qi et al., "A Unified Cache Coherence and Synchronization Protocol", Boston Area Architecture Workshop (BARC-2004), (Jan. 2004).
Quisquater et al., "Electromagnetic Analysis (EMA) Measures and Counter-Measures for Smart Cards", E-smart 2001, LNCS 2140, pp. 200-210 (2001).
Ramirez et al., "Branch Prediction Using Profile Data", Springer-Verlag Berlin Heidelberg, pp. 386-394, (2001).
Rao et al., "EMPowering Side-Channel Attacks", IBM Research Ctr. [online] Retrieved from the Internet:<URL:http://eprint.iacr.org/2001/037.pdf> [retrieved on Feb. 22, 2011] (May 2001).
Ranganathan et al., "Reconfigurable Caches and their Application to Media Processing", (ISCA'00) ACM, pp. 214-224, (2000).
Reinman et al., "An Integrated Cache Timing and Power Model", COMPAQ Western Research Lab, pp. 1-20, (1999).
Rugina et al., "Pointer Analysis for Multithreaded Programs", Proc. of SIGPLAN'99 Conf. on Program Language Design and Implementations, (May 1999).
Sair et al., "Memory Behavior of the SPEC2000 Benchmark Suite", IBM Thomas J. Watson Research Center Technical Report RC-21852, pp. 1-8, (Oct. 2000).
Sanchez et al., Static Locality Analysis for Cache Management, pp. 261-271, (1997).
Schlansker et al., "Achieving High Levels of Instruction-Level Parallelism with Reduced Hardware Complexity", Hewlett Packard Laboratories (HP-96-120), pp. 1-85, (1994).
Schwarz et al., "Disassembly of Executable Code Revisited", Proc. 9th Working Conf. on Reverse Engineering (WCRE'02), 10 pgs., (2002).
Simunie et al., "Source Code Optimization and Profiling of Energy Consumption in Embedded Systems", Proc. 13th Int'l Symposium on System Synthesis, pp. 193-198, (2000).
Singh et al., "Short Range Wireless Connectivity for Next Generation Architectures", Invited paper, appears in PDPTA, Las Vegas, NV, (2001).
Skorobogatov et al., "Optical Fault Induction Attacks", Proc. of Cryptographic Hardware and Embedded Systems (CHES'02), LNCS 2523, pp. 2-12, (2003).
Skorobogatov, S., "Breaking Copy Protection in Microcontrollers", [online] Retrieved from the Internet:<URL:http://www.cl.cam.ac.uk/~sps32/mcu_lock.html> [retrieved on Feb. 22, 2011] (2000).
Skorobogatov, S., "Data Remanence in Flash Memory Devices", Proc. of Cryptog. Hardware and Embedded Systems (CHES2005) [online] Retrieved from the Internet:<URL:http://s3.amazonaws.com/ppt-download/data-remanence-in-flash-memory-devices1949.pdf?response-content-disposition=attachment
&Signature=p5IXjx2Qcu760LiE02JwBVQHYCo%3D
&Expires=1298390877
&AWSAccessKeyId=AKIAJLJT267DEGKZDHEQ> [retrieved on Feb. 22, 2011] (2005).

Skorobogatov, S., "Tamper Resistance and Physical Attacks", Summer School on Cryptographic Hardware, Side-Channel and Fault Attacks (ECRYPT-2006), Jun. 12-15, 2006, Louvain-la-Neuve [online] Retrieved from the Internet:<URL: http://www.cl.cam.ac.uk/~sps32/#Publications> [retrieved on Feb. 22, 2011] (2006).
Sohi et al., "Instruction Issue Logic for High-Performance, Interruptable Pipelined Processors", ACM, pp. 27-34, (1987).
Srivastava et al., "Atom: A System for Building Customized Program Analysis Tools", Proc. of ACM SIGPLAN'94 Conf. on Programming Languages Design and Implementation, pp. 196-205, (1994).
Stanford University SUIF Compiler Group [online] Retrieved from the Internet:<URL: http://suif.stanford.edu/> [retrieved on May 4, 2004], (2004).
Steensgard, B., "Points-to Analysis in Almost Linear Time", POPL96, (1996).
Steinke et al., "Reducing Energy Consumption by Dynamic Copying of Instructions onto Onchip Memory", Proc. of the 15th Int'l Symposium on System Synthesis, pp. 213-218, (2002).
The Standard Performance Evaluation Corporation, http://www.spec.org, ( ® 2002).
Telikepalli, A., "Is Your FPGA Design Secure?", XCELL Journal, [online] Retrieved from the Internet:<URL:http://cdserv1.wbut.ac.in/81-312-0257-7/Xilinx/files/Xcell%20Journal%20Articles/xcell_47/xc_Secure47.pdf> [retrieved on Feb. 22, 2011] (2003).
Trichina et al., "Secure AES Hardware Module for Resource Constrained Devices", ESAS 2004, Lec. Notes in CompSci 3313, [online] Retrieved from the Internet:<URL:http://citeseerx.ist.psu.edu/viewdoc/download?doi=10.1.1.95.6712&rep=rep1&type=pdf> [retrieved on Feb. 22, 2011] (2005).
Tune et al., "Dynamic Predictions of Critical Path Instructions", IEEE, pp. 185-195, (2001).
Tygar et al., "Dyad: A System for Using Physically Secure Coprocessors", Tech. Rep. CMU-CS-91-140R, Carnegie Mellon University, 38 pgs., (1991).
Unnikrishnan et al., "Dynamic Compilation for Energy Adaption", IEEE / ACM Int'l. Conf. on Computer-Aided Design, (2002).
Unsal et al., "Cool-Cache for Hot Multimedia", in Proc. of the 34th Annual International Symposium on Microarchitecture (MICRO-34), Austin, TX, pp. 274-283, (Dec. 2001).
Unsal et al., "Cool-Cache: A compiler-enabled energy efficient data caching framework for embedded/multimedia processors", ACM Transactions on Embedded Computing Systems (TECS), vol. 2(3):373-392, (Aug. 2003).
Unsal et al., "Cool-Fetch: A Compiler-Enabled IPC Estimation Based Framework for Energy Reduction", Proc. of the 8th Annual Workshop on Interaction between Compilers and Computer Architecture (INTERACT-8), pp. 43-52, (Feb. 2004).
Unsal et al., "On Memory Behavior of Scalars in Embedded Multimedia Systems", Workshop on Memory Performance Issues, ISCA, Goteborg, Sweden, (Jun. 2001).
Unsal et al., "An Analysis of Scalar Memory Accesses in Embedded and Multimedia Systems," High Performance Memory Systems, Springer-Verlag, (2003).
Unsal et al., "Cool-Fetch: Compiler-Enabled Power-Aware Fetch Throttling," IEEE Computer Architecture Letters, vol. 1, (2002).
Unsal et al., "The Minimax Cache: An Energy Efficient Framework for Media Processors," IEEE, pp. 131-140 (2002).
Unsal et al., High-Level Power-Reduction Heuristics for Embedded Real-Time Systems, University of Massachusetts, pp. 1-6, (2000).
Unsal et al., Power-Aware Replication of Data Structures in Distributed Embedded Real-Time Systems, IPDPS 2000 Workshops, pp. 839-846, (2000).
Van Eck, W., "Electronic Radiation from Video Display Units: An Eavesdropping risk?", Computers & Security [online] Retrieved from the Internet:<URL:http://jya.com/emr.pdf>, [retrieved on Feb. 22, 2011] (1985).
Vinciguerra et al., "An Experimentation Frameowrk for Evaluating Disassembly and Decompilation Tools for C++ and Java", IEEE Proc. of the 10th Working Conf. on Reverse Engineering (WCRE'03), 10 pgs., (2003).

(56) References Cited

OTHER PUBLICATIONS

Voronin, A. "Data Storage on Hard Disks" [online] Retrieved from the Internet:>URL:http://www.digit-life.com/articles/bootman/index.html> [retrieved on Aug. 27, 2008].
Wall, David W., "Limits of Instruction-Level Parallelism", ACM, pp. 176-188 (1991).
Wang et al., "Combining 2-level Logic Families in Grid-based Nanoscale Fabrics", accepted by IEEE/ACM Symposium on Nanoscale Architectures(NanoArch'07), (Oct. 2007).
Wang et al., "Combining Circuit Level and System Level Techniques for Defect-Tolerant Nanoscale Architectures", 2nd IEEE International Workshop on Defect and Fault Tolerant Nanoscale Architectures (NanoArch 2006), Boston, MA, (Jun. 2006).
Wang et al., "Compiler-Based Adaptive Fetch Throttling for Energy Efficiency", Proc. of the 2006 IEEE International Symposium on Performance Analysis of Systems and Software(ISPASS'06), Austin, TX, (Mar. 2006).
Wang et al., "NASICs: A Nanoscale Fabric for Nanoscale Microprocessors", IEEE International Nanoelectronics Conference (INEC), (2008).
Wang et al., "Opportunities and Challenges in Application-Tuned Circuits and Architectures Based on Nanodevices", Proceedings of the First Conference on Computing Frontiers, pp. 503-511, Italy, (Apr. 2004).
Wang et al., "Self-Healing Wire-Streaming Processors on 2-D Semiconductor Nanowire Fabrics", NSTI (Nano Science and Technology Institute) Nanotech 2006, Boston, MA, (May 2006).
Wang et al., "Wire-Streaming Processors on 2-D Nanowire Fabrics", NSTI (Nano Science and Technology Institute) Nanotech 2005, California, (May 2005).
Wang, T., "Exploring Nanoscale Application-Specific ICs and Architectures", Boston Area Architecture Workshop (BARC-2004), (Jan. 2004).
Weber "Hammer: The Architecture AMD's of Next-Generation Processors", Microprocessor Forum, (2001).
Weingart et al., "Physical Security Devices for Computer Subsystems: A Survey of Attacks and Defenses", Workshop on Cryptographic Hardware and Embedded Systems (CHES2000), LNCS 1965, pp. 302-317 (2000).
White, R., "How Computers Work", Millenium Edition, Que Corporation, p. 36 (1999).
Wikipedia entry for "context switch", [online] Retrieved from the Internet: <URL:http://en.wikipedia.org/w/index.php?title=Context_switch&oldid=244184> [retrieved on Aug. 13, 2009], (Pub. Oct. 26, 2001).
Wilson et al., "Efficient Context-Sensitive Pointer Analysis for C Programs", Proc. ACM SIGPLAN'95 Conf. on Pgrogramming Language Design and Implementation, (Jun. 1995).
Wilton et al., "CACTI: An Enhanced Cache Access and Cycle Time Model", IEEE—Journal of Solid-State Circuits, 31(5):677-688 (1996).
Witchel, E., "Direct Addressed Caches for Reduced Power Consumption", IEEE, pp. 124-133 (2001).
Wollinger et al., "How Secure are FPGAs in Cryptographic Applications", Proc. of the 13th Int'l Conf. on Field-Programmable Logic and Applications (FPL-2003), 11 pgs. (2003).
Wollinger et al., "Security on FPGAs: State of the Art Implementations and Attacks", ACM Transactions on Embedded Computing Systems (TECS) TECS Homepage archive, vol. 3 Issue 3, [online] Retrieved from the Internet:<URL:http://www.wollinger.org/papers/Wollingeretal_ACMTransEmbed-
dedSysFPGACryptoOverview.pdf> [retrieved on Feb. 22, 2011] (Aug. 2004).
Yang et al., "An Integrated Circuit/Architecture Approach to Reducing Leakage in Deep-Submicron High-Performance I-Caches", IEEE, pp. 147-157 (2001).
Young et al., "Improving the Accuracy of Static Branch Prediction Using Branch Correlation", ACM, pp. 232-241, (1994).
Zhang et al., "Compiler Support for Reducing Leakage Energy Consumption", Proc. of the Design, Automation and Test in Europ Conference and Exhibition [DATE'03] (Mar. 2003).
Zhang et al., "Highly-Associative Caches for Low-Power Processors", Kool Chips Workshop, 33rd International Symposium on Microarchitecture, 6 pgs., (2000).
Zyuban et al., "Inherently Lower-Power High-Super-Performance Superscalar Architectures", IEEE Transactions on Computers, 50(3):268-285, (2001).
U.S. Appl. No. 60/541,875, filed Feb. 4, 2004.
U.S. Appl. No. 60/515,260, filed Oct. 29, 2003.
International Preliminary Examination Report in application PCT/US2003/21076, dated Sep. 10, 2004.
International Search Report in Application No. PCT/US03/20999, dated Oct. 10, 2003.
International Search Report for Application PCT/US03/21120, dated Jul. 30, 2004.
Action and Response History in U.S. Appl. No. 12/347,252, through Aug. 23, 2010.
Action and Response History in U.S. Appl. No. 10/191,774, through Aug. 28, 2008.
Action and Response History in U.S. Appl. No. 10/191,775, through Aug. 28, 2008.
Action and Response History in U.S. Appl. No. 10/191,646, through Aug. 12, 2009.
Action and Response History in U.S. Appl. No. 10/191,946, through Aug. 28, 2008.
Prosecution History for U.S. Appl. No. 10/987,374, through Jul. 20, 2011.
Prosecution History for U.S. Appl. No. 13/033,159, through May 24, 2012.
Prosecution History for U.S. Appl. No. 13/187,645, through May 24, 2012.
Prosecution History for U.S. Appl. No. 11/981,178, through Jun. 19, 2012.
Prosecution History for U.S. Appl. No. 10/967,989, through May 24, 2012.
P. Athanas et al. "Processor Reconfiguration Through Instruction-Set Metamorphosis" Published in "Computer" Magazine, vol. 26, Issue #3 . . . Copyrgt. 1993 IEEE (pp. 11-18).
B. Schneier. "Applied Cryptography, 2nd Edition" .Copyrgt. 1996 John Wiley & Sons Inc. (pp. 13 and 270-278).
Proposals for Telephone Interviews conducted Oct. 21, 2010 and Aug. 11, 2010 (21 pages total).
ltoh et al., "DPA Countermeasure Based on the Masking Method", ICICS'01, LNCS 2288, pp. 440-456 (2002).
Action and Response in U.S. Appl. No. 11/037,663, through Nov. 9, 2009.
Action and Response in U.S. Appl. No. 10/967,989, through Nov. 9, 2009.
Abraham et al., "Automatic and Efficient Evaluation of Memory Hierarchies for Embedded Systems," micro, p. 114, 32nd Annual IEEE/ACM International Symposium on Microarchitecture (MICRO'99), 1999.
Action and Response in U.S. Appl. No. 11/037,663, through Aug. 12, 2009.
Action and Response in U.S. Appl. No. 10/967,989, through Aug. 14, 2009.
Action and Response in U.S. Appl. No. 11/037,663, through Jan. 8, 2010.
Action and Response in U.S. Appl. No. 11/037,663, through May 5, 2010.
Action and Response in U.S. Appl. No. 10/967,989, through May 5, 2010.
Action and Response in U.S. Appl. No. 11/804,947, through Oct. 19, 2010.
Office Action in U.S. Appl. No. 12/347,252, dated Aug. 23, 2010.
Action and Response in U.S. Appl. No. 11/037,663, through Aug. 12, 2010.
Action and Response in U.S. Appl. No. 10/967,989, through Jul. 27, 2010.
Action and Response in U.S. Appl. No. 11/804,947, through Apr. 1, 2010.

(56) References Cited

OTHER PUBLICATIONS

Office Action in U.S. Appl. No. 11/981,178, dated Jan. 7, 2011.
Office Action dated Apr. 28, 2011 in U.S. Appl. No. 11/037,663.
Prosecution History for U.S. Appl. No. 11/804,947, through Mar. 8, 2011.
Prosecution History for U.S. Appl. No. 11/037,663, through Mar. 8, 2011.
U.S. Appl. No. 60/856,593, filed Nov. 3, 2006.
Itoh et al., "DPA Countermeasure Based on the Masking Method", ICICS'01, LNCS 2288, pp. 440-456 (2002).

* cited by examiner

SECURITY OF PROGRAM EXECUTABLES AND MICROPROCESSORS BASED ON COMPILER-ARCHITECTURE INTERACTION

RELATED U.S. APPLICATION DATA

This application claims the benefits of U.S. Provisional Application No. 60/520,838, filed on Nov. 17, 2003, and Confirmation No 3408, entitled: IMPROVING SECURITY OF PROGRAM EXECUTABLES AND MICROPROCESSORS BASED ON COMPILER-ARCHITECTURE INTERACTION, the contents of which are hereby incorporated by reference into this application as if set forth herein in full.

TECHNICAL FIELD

This invention relates generally to improving security in microprocessors based on compiler architecture interaction, without degrading performance or significantly increasing power and energy consumption. More particularly, it relates to protecting program executables against reengineering of their content and protecting processors against physical microprobing or accessing information about a program executed at runtime.

BACKGROUND

Microprocessors (referred to herein simply as "processors") execute instructions during their operation. It is very important to improve security during execution and preferably energy/power consumption should not significantly be affected by the solution.

Security is compromised when reengineering of program executables is possible. In addition, security of a solution such as an application intellectual property or algorithm is compromised when a processor can be physically microprobed and program information extracted without permission.

Program intellectual property can be re-engineered from binaries without requiring access to source codes. As reported by the Business Software Alliance, software piracy cost the software industry 11 billion dollars in 1998. Furthermore, an increasing number of tamper-resistant secure systems used in both military and commercial domains, e.g., smartcards, pay-TV, mobile phones, satellite systems, and weapon systems, can be attacked more easily once application semantics, including critical security algorithms and protocols, are re-engineered.

A key reason for many of these problems is that current microprocessors use a fixed Instruction Set Architecture (ISA) with predefined opcodes. Due to complexity, cost, and time-to-market issues related to developing proprietary microprocessors, most recent applications use commodity COTS components.

In software compiled for such systems, individual instruction opcodes as well as operands in binaries can be easily disassembled given that ISA documentation is widely available. Conventional systems can also be microprobed and these instructions extracted from the instruction memory systems or instruction buses.

Making the ISA reconfigurable (as a way to address these problems) is challenging, especially since a practically feasible solution would need to achieve this without significantly affecting chip area, performance and power consumption. Furthermore, it would be advantageous and practical if it could be retrofitted as add-on technology to commercially available microprocessor intellectual property (IP) cores from leading design houses such as ARM and MIPS. It should be backward compatible, e.g., capable of executing existing binaries to avoid losing existing software investments. Another critical aspect is migrating existing binaries to this new secure mode of execution without access to application source codes.

For a given processor there are typically many compilers available provided by many different vendors. These compilers have their own advantages and disadvantages. Moreover, when compiling an application many pieces of codes are added from precompiled libraries or hand-written assembly language.

Accordingly, if security-awareness is introduced at the executable-level, rather than at source code level, as in one embodiment of the present invention, by transforming the executable itself, significant practical advantages could be achieved. The goal would be to security-optimize executables that may have been fully optimized previously with a source-level compiler targeting a design aspect such as performance.

SUMMARY

The compiler-architecture interaction based processor framework described herein addresses the foregoing need to improve security in a practical and flexible manner.

The approach provides security without adverse effects on chip area, performance and with scalability to different processor instructions sets and easy integration with other compilation tools.

In one embodiment, the executable file itself provides a convenient interface between, for example, performance-oriented optimizations and security-oriented optimizations. Security optimizations in the compiler can be combined with, for example, energy oriented optimizations. Nevertheless, the invention is not limited to binary level compilation or compilation performed on executables; it can be also be added in source-level compilers without limitation.

The new microprocessor framework proposed in this invention has the potential to solve the security problems raised above in a unified manner. It is based on a tightly integrated compiler-architecture framework.

We call this microprocessor VISC, or (Virtual Instruction Set Computing), based on its property that instructions (and thus instruction opcodes) in application binaries are continuously reconfigured, changing meaning at a very fine compiler-managed program granularity. The actual reference ISA of the microprocessor is only visible during execution in the processor pipeline and used as a reference to generate control signals. Viewed in another way, there is no reference ISA just a reference control mechanism. VISC binaries can be made specific to a unique product and/or each binary can be made unique even if it is based on the same source code. This is achieved by having the initial reconfiguration-related secret, that is hidden in the processor, product specific.

Based on this framework, security-aware microprocessors can be developed that will make software copy and tamper resistant. We would argue that a security-aware tightly integrated compiler-architecture approach such as VISC is ideal to protect software against various types of security attacks including physical microprobing of the memory system and buses as well as enables unique defense on non-invasive attacks such as differential power analysis.

Supporting basic VISC security requires a special security-aware compiler or a security-aware binary morphing tool or similar source-level compiler, and small modifications to a microprocessor. Aspects related to security features provided, e.g., tamper and copy resistance, resistance against physical tampering with attacks such as fault injection and power analysis, and prevention of unauthorized execution are reviewed in the Description.

In addition to conventional instructions, VISC requires either modifications to instructions or new so-called static control instructions to drive the security architecture.

A key aspect of VISC is to communicate to execution engines how to decode/un-scramble instructions. Similarly, it could communicate how to execute instructions in their most energy efficient mode in addition to what operations to execute. Such static control instructions are continuously inserted in the instruction stream to provide the control information required to decode and control short sequences of instructions in the instruction stream. The control instructions can also be based on co-processor instructions not requiring modifications to a processor's regular ISA and thus easily integrated in existing processor cores.

In one embodiment, a special static decode unit first un-scrambles and then decodes these control instructions and generates control signals.

In one embodiment, to support a secure execution environment, the very initial few basic blocks or just the initial scrambling key are encrypted using public-key or symmetric cryptography. A VISC microprocessor contains the private key to decrypt these blocks or keys at runtime. Downloading the key can also be supported.

The remaining part of the instruction stream is scrambled/reconfigured at compile time in the following manner: At the beginning of each basic block, or larger blocks such as super blocks, a special static control instruction is inserted. Note that the reconfiguration of instructions can be done by selecting fully random reconfiguration keys at each reconfiguration step. This is possible as a security static instruction, that is scrambled with a previous random key, contains the reconfiguration parameters required for decoding the next instruction(s).

A security instruction encodes a scrambling scheme for the Block. This same static instruction can be leveraged to support compiler-managed power optimizations.

During code generation, all the instructions in the referred basic block are scrambled using the same random scheme. At runtime, once a static control instruction is decoded, it (reconfigures) the un-scrambling hardware to the specified scheme. Examples of scrambling that can be supported with minimal circuit delay and area overhead include: flipping of selected bits, rotations, and combination of those. These transformations are not intended to be limiting: other schemes can be easily derived and controlled similarly.

Once instructions are un-scrambled and decoded, the execution in the execution stage proceeds as normal in the similarly to the reference or original ISA.

Each static instruction is either encrypted or scrambled based on a scrambling scheme defined in a previous static instruction in the control-flow graph. At runtime, a secure boot code that accesses the private key from an EEPROM type of device decrypts and executes the first block or so until a static instruction is reached. Initial parameters that are required, such as the length of the code that needs to be decrypted with the private key, or just the initial reconfiguration key, could be provided in the same encrypted way.

Once a static control instruction is reached, subsequent static instructions take over control for the remainder of the execution. Note that this means that the performance impact of the private key based decryption is amortized across the whole duration of the program.

If an entire program were encrypted using public-key or symmetric-key cryptography, it would make execution prohibitively slow and power/energy consumption would increase even if decryption were implemented in hardware.

In contrast, the approach in this invention has very little area, performance, or power overhead. The initial decryption overhead is insignificant for most of the applications. In a software implementation using ECC this decryption takes 1.1 million cycles.

A static security control instruction can be folded from the pipeline or executed in parallel with any instruction from a previous basic block.

In general, there might be several compilers available for one particular processor or an instruction set architecture. The approach based on executables can be easily integrated with some or all of these compilers without requiring changes in the source-level compiler.

The invention can be used to improve security on any type of device that includes a processor. For example, the invention can be used on personal computers, devices containing embedded controllers, sensor networks, network appliances, and hand-held devices, cellular telephones, and/or emerging applications based on other device technologies.

Unless otherwise defined, all technical and scientific terms used herein have the same meaning as commonly understood by one of ordinary skill in the art to which this invention belongs. Although methods and materials similar or equivalent to those described herein can be used in practice, suitable methods and materials are described below. In addition, the materials, methods, and examples are illustrative only and not intended to be limiting.

Other features and advantages of the invention will become apparent from the following description, including the claims and drawings.

DESCRIPTION

In the embodiments described herein, a processor framework uses compile-time information extracted from an executable or source-level and the executable is transformed so as to reduce vulnerability due to binary reengineering or extracting information at runtime in a processor. The security is improved without significantly affecting chip area, power or performance.

Figure 1:
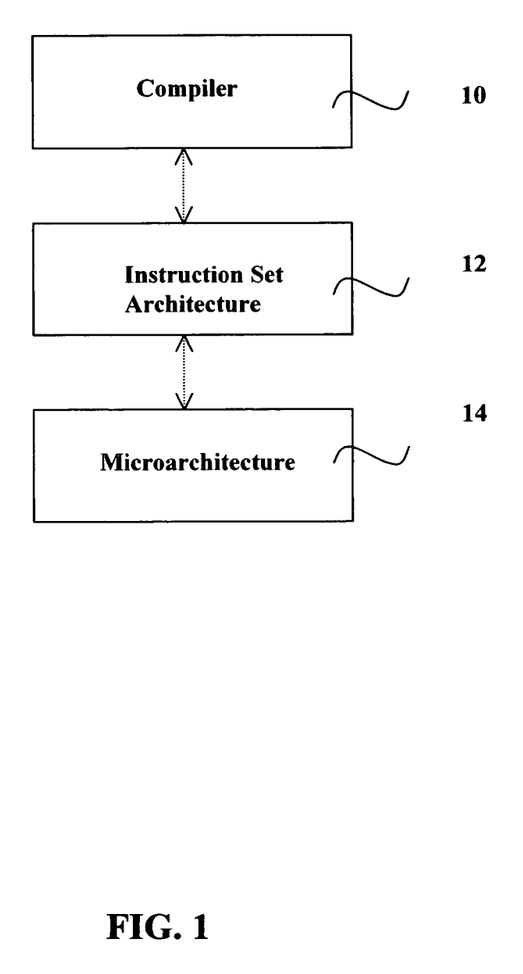
FIG. 1 is a block diagram showing the relationship between a source-level compiler, instruction set architecture, and microarchitecture in a processor.

Referring to FIG. 1, a compiler 10 is a software system that translates applications from high-level programming languages (e.g., C, C++, Java) into machine specific sequences of instructions. An instruction set architecture (ISA) 12 is a set of rules that defines the encoding of operations into machine specific instructions. The ISA acts as the interface between the compiler 10 and the microarchitecture (14). A computer program is a collection of machine level instructions that are executed to perform a desired functionality. Micro-architectural (or architectural) components 14 primarily comprise hardware and/or software techniques that are used during execution of the program. The actual machine can be a microprocessor or any other device that is capable of executing instructions that conform to the encoding defined in the ISA.

Compile-time refers to the time during which the program is translated from a high-level programming language into a machine-specific stream of instructions, and it is not part of execution or runtime. Runtime is the time it takes to execute translated machine instructions on the machine. Compilation is typically performed on a different host machine than execution and it is done on the source program.

In contrast, executable-level re-compilation is a process that uses an application's executable as input and performs analysis and modifications at the executable-level.

Figure 2:
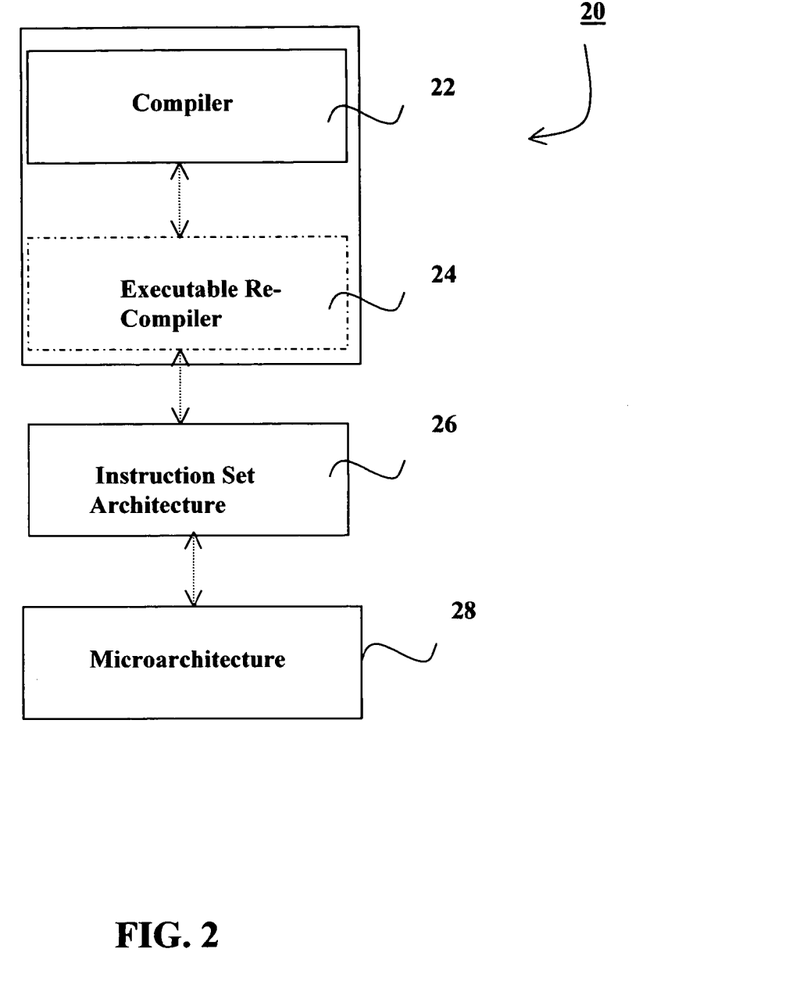
FIG. 2 is a block diagram showing the relationship between the executable-level re-compiler, conventional source-level compiler, instruction set architecture, and microarchitecture in a processor.

Referring to FIG. 2, an executable-level re-compiler or executable-level compiler 24 is a software system that translates applications from executable-level into machine-specific sequences of instructions 26. The remaining components 26 and 28 are similar to the components 12 and 14 in a conventional compiler system as shown in FIG. 1.

The present invention is applicable to both source-level and binary-level compilers and processors using binaries from either of these tools.

VISC Architecture

In one embodiment, protection in a VISC architecture is provided by a combination of public-key encryption such as ECC or RSA, and a continuous compiler-enabled fine-granularity scrambling/reconfiguration of instructions.

The private key is stored in a tamper-resistant device and used at runtime to decrypt the initial reconfiguration key or sequence before execution starts. The corresponding public part of the encryption key is used during compilation and it is made available in the software compilation tools so that anyone can generate binaries.

In one aspect, only a header block or initial reconfiguration parameter is chosen to be encrypted with the public key. The decryption can be implemented with microcode, can be hardware supported, or can be implemented with trusted software.

The rest of the code is scrambled at a very fine compiler managed program granularity. This has the effect of having multiple ISAs in the same application binary. Moreover, these ISAs can be generated fully randomly. Un-scrambling is managed by the inserted static security control instructions that identify un-scrambling rules to be used at runtime.

The boundary between the encrypted part and the first scrambled block can be placed anywhere in the binary.

Another embodiment is to have the private key encrypt the key of a faster symmetric key encryption such as DES, Triple DES, or AES. A disadvantage of such an approach is that one would also need the secret key for the symmetric cipher to generate code.

In one embodiment, the mapping between the un-scrambling schemes supported at runtime and the encoding of static control instructions is reconfigurable with reconfiguration parameters that are stored encrypted and can be decrypted only with the private key.

A reconfigurable un-scrambling logic and a special decode unit (called static decode) support un-scrambling of the specified instructions from each block, and decoding of the static control instructions.

Programming is done by executing trusted instructions, e.g., that are part of the microcode, and is defined by the encrypted reconfiguration parameter. For example, 32-bit numbers can define new permutations of instruction bits that alter reference scrambling schemes encoded with static instructions.

In one aspect, programming of this mapping is done at the beginning of execution after the decryption of the initial header block is completed and before any static instruction is executed. Scrambling of the binary at compile time is done at a very fine program granularity such as basic blocks or at larger granularity such as super blocks. The compiler must guarantee, when selecting these blocks, that there is no branching out and there are no branch instructions elsewhere that would branch in. This scrambling can be combined with additional transformations that are based on program addresses.

The size of these blocks is variable, ranging from a small number of instructions to possibly tens or hundreds of instructions. The security-aware compiler decides what scrambling rule to apply to each block and inserts a control instruction at the top.

In one aspect, after scrambling, instruction opcodes remain (mostly) valid, just their meanings are changed. This is because the majority of possible bit permutations in opcode fields are already used up in modern ISAs, so permutations of opcode bits will likely just create other valid instructions. The length of the blocks scrambled with one key/scheme is program and compilation dependent. The schemes used can be generated randomly at compile time.

At runtime, as soon as the initial header block or reconfiguration key is decrypted, the approach goes into a phase overseen by the static control instructions. The execution of the application from that point on is driven by the control instructions that always preset the un-scrambling rule to be applied in a subsequent sequence of instructions or instruction. Execution otherwise happens as usual in the pipeline.

In one aspect, a basic VISC approach can be combined with additional mechanisms, enabled by the VISC compiler-architecture framework, to protect against leaking out information from various parts of the microprocessor. A key benefit is that its protection boundary can be extended to incorporate most of the processor domains, like the memory system including caches and buses, that are normally the target of security attacks. Moreover, it is easy to combine the compiler-driven approach with runtime techniques for additional level of security.

In one embodiment we have implemented, even the data that is in the execute stage before a memory operation is modified by randomly modifying the data at compile time and taking into account these modifications in the codes that consume the data. This would mean not only that the date is obfuscated in the memory system but even when passes the execute stage. This significantly increases the hurdles for differential power attacks and there will be no correlation between the data in the pipeline across several executions of the same code.

The content that must be preserved tamper resistant is the device that contains the private key used to initialize. A VISC system protects against physical probing in key parts of the microprocessor including the memory system, buses, and in some cases hide the data in the pipeline making execution of a sequence fully dynamic and changing from one execution to another. In addition, deep sub-micron feature sizes in future process generations make reconstructing the circuitry of complex processor pipelines expensive and very time-consuming to perform. This is important as in many secure systems sensitive information has a strategic value to the opponent only if extracted within a certain time-frame.

Protection in Caches and External Memory

In one embodiment of this invention the executable file is analyzed by a binary scanning tool in order to gain information about the various sections and any other symbolic information that may be available. This information is used in order to create a secure version of the program.

Instructions in VISC systems are decrypted or un-scrambled solely during decoding. This implies that binaries are protected everywhere in the instruction memory including L1/L2 caches, buses, and external memory. While the approach in this embodiment does not stop someone from inserting instructions, the meaning of these instructions will be different from the one intended. Attacks based on physical tampering that require reading instruction caches/memory are strongly protected against.

A solution to protect the data memory is not automatically provided by a reconfigurable instruction set approach. While in a VISC system instruction operands can also be in scrambled form, during execution L1 data caches and data memory will contain valid data. Although existing tampering schemes typically rely on having access to both instructions and data, without other architectural or compiler level protection valid data could potentially be accessed and may present a possible security weakness.

In one embodiment of this invention, a solution is to encrypt each cache block and add a tag containing a hash calculated on the data values. A tag also protects against unauthorized modifications. When data values are modified, the stored tag will not match the calculated one and a security related exception can be raised. The tag can be put into a small cache if this aspect would need to be able to get most of the modification attempts (that would increase the hurdles for an attacker significantly) or into an indexed small SRAM if all memory stores would need to be protected. This depends on application.

Adding this type of support on L1 data caches could however affect performance somewhat even with a pipelined hardware implementation.

A lower overhead approach that can be provided in VISC in many application areas is based on security-aware compilation and minor microarchitecture support. The approach requires alias analysis to determine the possible location sets for each memory access at compile time. A location set contains the possible memory ranges a memory access can go to at runtime.

Within disjoint groups of location sets, a scrambling rule similar to the one used for instructions would be defined and written into the register file. A small number of special registers could be provided if register pressure becomes an issue. One would need to make sure at compile time that memory accesses within each location set group are always generated with the same scrambling rule.

In one embodiment, the approach could have only a single rule for data. During runtime, whenever data is written, it is written scrambled. During execution of a load instruction, before the data is loaded into the register file it is un-scrambled. Simple techniques such as based on bit flipping would add little overhead and could possibly be supported without increasing cache access time.

One could also support multiple active rules within a basic block. In that case, the static control instruction would need to identify the special register that should be used during runtime to un-scramble the memory instruction. A simple solution to support two different rules would be to have them defined in a static control instruction. For example, a bit vector could tell which memory operations would be using which scheme in a basic block.

As there are typically 1 to 3 memory operations in a basic block, three bits would be enough to encode it. More then two rules per block would require more bits per memory instruction. In each loop one could use two data scrambling rules, but may provide different scrambling between various loops if possible.

Figure 3:
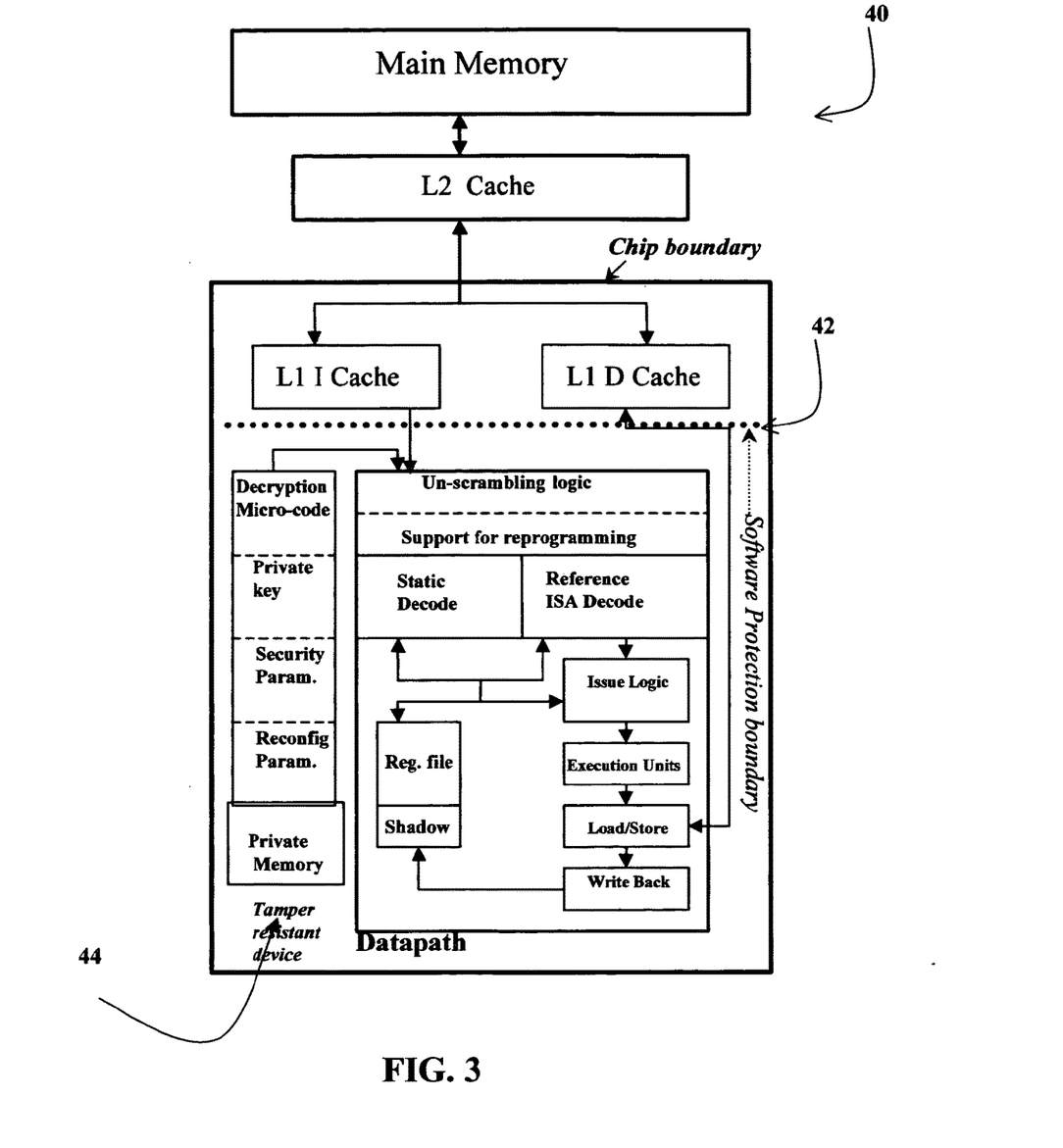
FIG. 3 is a block diagram showing an embodiment of a VISC architecture.

A block-level overview of an embodiment of a VISC architecture 40 is shown in FIG. 3. As shown in the figure, software is strongly protected in (at boundary 42) caches and external memory and buses. Only physical tampering with the core processor circuitry (below boundary 42) and the device 44 that contains the private key may compromise VISC's protection of software. The figure shows one possible embodiment and is not intended to be limiting; different execution mechanisms and memory hierarchies are also possible and the protection boundary could be extended to other processor areas with VISC.

Further Protection Against Security Attacks

Cryptographic research has traditionally evaluated cipher systems by modeling cryptographic algorithms as ideal mathematical objects. Conventional techniques such as differential and linear cryptanalysis are very useful for exploring weaknesses in algorithms represented as mathematical objects. These techniques, however, cannot address weaknesses that are due to a particular implementation that often require both software and hardware components. The realities of a physical implementation can be extremely difficult to control and often result in leakage of side-channel information. Successful attacks are frequently based on a combination of attacks that are used to leak information about a hidden secret, and use this side-channel information to reduce the search space and mount an exhaustive attack.

There is a wide range of security attacks that can be mounted to reveal secrets in secure systems. Techniques developed have shown how surprisingly little side-channel information is required to break some common ciphers. Attacks have been proposed that use such information as timing measurements, power consumption, electromagnetic emissions and faulty hardware.

Protection Against Unauthorized Execution

Only processors that have the right private key could start executing VISC binaries correctly. Several products that contain the microprocessor could contain the same key, but one could also provide support to an authorized party to upload a new key making the binary run only on one particular product. Additional techniques, such as based on tagging each cache line in the instruction memory (with a hash such as MD5), can be provided to protect against unauthorized modifications in the instruction memory. Nevertheless, VISC already provides a lazy protection against unauthorized execution even without additional tagging. The protection is lazy as modification is not immediately stopped but only typically after 1 to 3 instructions.

Power Analysis Attacks

A Simple Power Attack (SPA) is based on directly monitoring the system's power consumption. Different attacks are possible depending on the capabilities of the attacker. In some situations the attacker may be allowed to run only a single encryption or decryption operation. Other attackers may have unlimited access to the hardware. The most powerful attackers not only have unlimited access, but also have detailed knowledge of the software.

A Differential Power Attack (DPA) is more powerful than an SPA attack because the attacker does not need to know as many details about how the algorithm was implemented. The technique also gains strength by using statistical analysis. The objective of the DPA attacks usually is to determine the secret key used by a cryptographic algorithm.

In both of these cases small variations in the power consumed by different instructions and variations in power consumed while executing data memory read/write instructions can reveal data values. One way to prevent a power analysis attack is to mask the side-channel information with random calculations that increase the measurement noise.

The approach in an embodiment of this invention to reduce the vulnerability of DPA attack is based similarly on increasing the measurement noise. The approach is leveraging BlueRISC's compiler-architecture based power/energy optimization framework.

In one aspect, a method optimizes power consumption by providing multiple access paths managed by the compiler.

For example, in the case of the data cache, several mechanisms are provided such as fully statically managed, statically speculative, and various dynamic access modes. Energy reduction is achieved by eliminating redundant activity in the data cache by leveraging static information about data access patterns available at compile time.

The compiler predicts for each memory access which is the most energy efficient and selects that path. The energy consumed per memory instruction is lowest for the statically managed modes and highest for the conventional modes. With provided architectural support one can detect if an access path is incorrectly chosen at compile time and the operation is rerun in a conventional way. The variation, in the preferred embodiment, in consumed energy per memory access can be as much as a factor of 10.

The energy reduction approach alone is often enough to introduce enough power noise/variation given that various data memory access paths are already selected in a program and data dependent manner. As compared to introducing random calculations, such an approach to increase the measurement noise would have minimal performance impact.

The compiler approach that is used for energy optimization can be used to further randomize the power cost for data accesses in critical portions of codes such as cryptographic algorithms. This is accomplished at compile time by deliberately selecting access paths with different power requirements.

In addition, as described in earlier section, one could make sure at compile time that even the content of data passed into the execute stages before store operations is modified from execution to execution for the same program. This would make it much more difficult to correlate data before stores with differential binary analysis. Because the approach is compiler driven, the level of protection can be adjusted at compile time in an application specific manner without requiring changes to the hardware.

Fault Infection Attacks

The cryptographic literature lists attacks that are based on injecting faults in secure systems. For example, in 1996, Biham and Shamir describe an attack on DES using 200 ciphertexts. They introduce one-bit errors produced by environmental stress such as low levels of ionizing radiation. Another type of attack is demonstrated based on glitches introduced to the clock or power supply. The idea is that by varying the timing and the duration of the glitch the processor can be forced to execute a number of wrong instructions. Fault injection can be used in conjunction with other attacks such as power analysis.

The feasibility of such an attack in the context of VISC is questionable. It is more likely that such changes in the instruction stream would cause irrelevant and uninformative exceptions rather than leak side-channel information. This is due to the fact that VISC instructions can be protected efficiently against power analysis and that VISC instructions and opcodes are scrambled with different and reconfigurable keys, so such leaked information would be very difficult to interpret.

Spoofing, Splicing and Replay

Splicing attacks involve duplicating or reordering segments of instructions. Replaying attacks are based on recording ciphertext (valid sequences of instructions) and executing them at later times. Spoofing attacks would typically involve changing data in the data memory. These attacks would be likely combined with some sort of physical tampering such as power analysis and fault injection. The objective is again to reveal some secret.

These attacks could be eliminated by the tagging of the instruction memory and the encryption/tagging of the data memory mentioned earlier. But, even without tagging support, using such attacks in VISC is unlikely to be successful since VISC instructions are reconfigured at a fine compiler defined (and variable) granularity.

In one aspect, in VISC it is possible to have each instruction scrambled differently. For example, one could have a combined scheme where the key used to un-scramble is shifted after every instruction in the block, effectively changing the meaning of the opcodes at the individual instruction granularity.

A combination of various randomly-selected scrambling approaches and the variable length blocks make reconstructing valid sequences of instructions very hard. An exhaustive search would involve trying out possible block boundaries and thus exhaustively trying to re-engineer sequences of instructions. Permutations of bits in instructions will likely result in other legal instructions, further increasing the complexity of distinguishing real instruction sequences from just sets of valid instructions.

Furthermore, as mentioned earlier, the meaning of the static instructions, i.e., the mapping between the scrambling schemes supported and the bits encoding them, is reconfigurable.

To give an approximation of the difficulty of breaking this encoding, one would need to try 2 to the power of 32 permutations (for a 32-bit ISA) for each instruction and try to combine variable length sequences of such instructions into valid instruction sequences. Note that many valid solutions may exist. Even if an individual static control instruction were to be recovered, its actual meaning would still be unknown (as it is modified by the reconfiguration mechanism). Furthermore, it would be impossible to distinguish real static (or regular) instructions from permutations of other real instructions.

VISC Security-Aware ISA

A key aspect is to scramble the interface between architecture and compilation. The mechanism to achieve this is based on inserting decoding related bits into the instruction stream and scrambling at compile time instruction blocks referred to by these bits. Our objective with this is to develop a microprocessor that effectively appears as a reconfigurable ISA machine. Note that the approach is more powerful than that, as not only the opcodes but even operand bits are reconfigured from their original meaning.

In one aspect, one can encode the various scrambling schemes with one compact static instruction format. One possibility is to use a single static control information related instruction per basic block or super block that encodes the control information for the whole duration of the block at runtime. The added hardware component would be a different decode unit that we call static decode. This unit would be responsible for generating the control signals for the whole duration of the block. Overall, the idea to encode static information for the duration of a basic block is interesting because the order of execution is known.

To illustrate this aspect with a simple example, imagine that there are two un-scrambling related bits in a control instruction. For example, if a control instruction contains two zero un-scrambling bits, the basic block instructions encoded with it could have two (or more) specific bit positions flipped. Un-scrambling can be done with very little overhead, by simply inverting those bits for all instructions (in the controlled block) at runtime.

An advantage of this embodiment is that it does not require any modification to existing instructions so it would be easy to add to existing designs. Most of the designs have reserved opcodes for future ISA extensions or co-processors where static control instructions could be incorporated. With our compiler-enabled instruction cache optimization techniques, the effect of code dilution on power consumption is practically negligible as most of these added instructions will be fetched from a compiler-managed energy efficient cache.

To extend the possible encoded combinations from 2 to the power of 23 (such as is available in an ARM ISA) one would need to periodically insert static region control instructions that would alter the meaning of a number of subsequent regular control instructions. This way the possible scrambling schemes supported can be extended to all 2 to the power of 32 permutations.

In one aspect, individual blocks have different scramblings. The actual scheme can be randomized at compile time, by randomly selecting a scrambling approach for each block. Such a scheme would make any two instances of the binary for the same application to look different. Furthermore, the initial configuration parameter that defines the mapping between the bits in the control instructions and the supported schemes, can also be used to make the scrambling scheme different for various applications or chips.

Static instructions at the root of control-flow subtrees define scrambling of static instructions in the subtrees. This can be supported easily at runtime; a particular un-scrambling scheme would be used at runtime until a new static instruction would override it and so on. As each static instruction operates on well defined boundaries, such as basic blocks, without possibility to enter that code from elsewhere or branch out, there is a well defined mapping between scrambling at compile time and un-scrambling at runtime that guarantees correct execution.

Other Embodiments

The invention is not limited to the specific embodiments described herein. Other types of compiler analyses and/or architecture support may be used. The invention may be applied to control security aspects in any appropriate component of a processor. The optimizations and/or analyses may be performed in a different order and combined with other techniques, in other embodiments.

Other embodiments not described herein are also within the scope of the following claims.

What is claimed is:

1. A processor comprising:
   memory storing instructions for an instruction stream of a program executable, the instruction stream comprising blocks of instructions, a first block of instructions among the blocks of instructions having been encoded in a first instruction set architecture using a first technique, and a second block of instructions among the blocks of instructions having been encoded in a second instruction set architecture using a second technique, the first instruction set architecture being different from the second instruction set architecture, the instruction stream further comprising a first control instruction and a second control instruction, the first control instruction preceding the first block of instructions in the instruction stream, the first control instruction providing first information about the first technique, and the second control instruction preceding the second block of instructions in the instruction stream, the second control instruction providing second information about the second technique; and
   a decoder to receive the instruction stream and to perform operations comprising:
      receiving the first control instruction in the instruction stream;
      obtaining, from the first control instruction, the first information about the first technique;
      receiving the first block of instructions in the instruction stream;
      using the first information to decode the first block of instructions to produce first decoded instructions;
      outputting, in a pipeline of the processor, the first decoded instructions;
      receiving the second control instruction in the instruction stream;
      obtaining, from the second control instruction, the second information about the second technique;
      receiving the second block of instructions in the instruction stream;
      using the second information to decode the second block of instructions to produce second decoded instructions; and
      outputting, in the pipeline of the processor, the second decoded instructions.

2. The processor of claim 1, wherein the pipeline comprises an execution stage to receive the first and second decoded instructions.

3. The processor of claim 1, wherein the first information is usable to configure the decoder to decode the first block of instructions, and the second information is usable to configure the decoder to decode the second block of instructions.

4. The processor of claim 1, wherein at least one of the first control instruction or the second control instruction comprises a co-processor instruction.

5. The processor of claim 1, further comprising:
   memory storing a compiler to perform operations comprising:
      generating the first block of instructions and the second block of instructions;
      generating the first control instruction and the second control instruction; and
      generating the instruction stream from the first control instruction, the second control instruction, the first block of instructions, and the second block of instructions.

6. The processor of claim 1, wherein a third block of instructions among the blocks of instructions has been encoded in a third instruction set architecture using a third technique, the third instruction set architecture being different from both the first instructions set architecture and the second instruction set architecture, the instruction stream further comprising a third control instruction that precedes the third block of instructions in the instruction stream, the third control instruction providing third information about the third technique; and     wherein the decoder is configured to perform operations comprising:

receiving the third control instruction in the instruction stream;

obtaining, from the third control instruction, the third information about the third technique;

receiving the third block of instructions in the instruction stream;

using the third information to decode the third block of instructions to produce third decoded instructions; and         outputting, in the pipeline of the processor, the third decoded instructions.

7. The processor of claim 1, wherein the first technique comprises a process according to which bits of the first block of instructions are coded, and the second technique comprises a process according to which bits of the second block of instructions are coded.

8. The processor of claim 1, wherein at least one of the first or second control instructions is coded using keys.

9. The processor of claim 1, wherein at least some of the blocks of instructions are scrambled for security and comprise flipped bits, rotated bits, or a combination of flipped bits and rotated bits.

10. The processor of claim 1, wherein the decoder comprises a static decode part to decode control instructions and an instruction decode part to decode blocks of instructions.

11. The processor of claim 1, further comprising memory to store a compiler configured to affect redundant activity in a data cache by leveraging static information about data access patterns in the processor that are available at compile time.

* * * * *